United States Patent [19]
Ikegame

[11] Patent Number: 6,093,962
[45] Date of Patent: Jul. 25, 2000

[54] HIGH FREQUENCY SHIELDING CASE OF SEMICONDUCTOR LASER

[75] Inventor: Tetsuo Ikegame, Hachioji, Japan

[73] Assignee: Olympus Optical Co., Ltd., Tokyo, Japan

[21] Appl. No.: 09/238,279

[22] Filed: Jan. 27, 1999

[30]  Foreign Application Priority Data

Jan. 29, 1998  [JP]  Japan .................................. 10-016936

[51] Int. Cl.$^7$ .......................... H01L 21/00; H01L 21/64; H01L 23/34
[52] U.S. Cl. .......................................... 257/728; 29/25.01
[58] Field of Search ............................. 29/25.01; 257/728

[56]  References Cited

U.S. PATENT DOCUMENTS 4,387,297  6/1983  Swartz et al. .
4,707,067  11/1987  Haberland et al. .

FOREIGN PATENT DOCUMENTS 5-16649   5/1993  Japan .
5-189796  7/1993  Japan .
7-20935   5/1995  Japan .

OTHER PUBLICATIONS

Nikkei Electronics, Sep. 22, 1997, No. 699, pp. 13 and 14, published by Nikkei Business Publications, Inc., Japan.
Nikkei Byte, Sep., 1997, pp. 148–151, published by Nikkei Business Publications, Inc., Inc. Japan.

*Primary Examiner*—David E. Graybill
*Attorney, Agent, or Firm*—Frishauf, Holtz, Goodman, Langer & Chick, P.C.

[57] ABSTRACT

A high frequency shielding case of a semiconductor laser apparatus, according to the present invention, comprises a soldering fixing plate, together with a semiconductor laser holding member, fixed by a screw to a fixing member, a shielding case half overlaid on the fixing plate on a side opposite to the holding member and having an opening through which a terminal of the semiconductor laser is inserted, an additional shielding case half overlaid on the above-mentioned shielding case half and co-acting with the above-mentioned shielding case half to store a high frequency oscillation circuit board connected to the terminal, and a solder connecting a solder attaching portion of the fixing plate to a portion of at least one of the above-mentioned shielding case half and additional shielding case half, the portion corresponding to the solder attaching portion.

6 Claims, 4 Drawing Sheets

HIGH FREQUENCY SHIELDING CASE OF SEMICONDUCTOR LASER

BACKGROUND OF THE INVENTION

This invention relates to a high-frequency shielding case of a semiconductor laser apparatus.

It has been widely known that a high-frequency oscillation circuit for semiconductor laser has to be stored in a high-frequency shielding case for shielding an electromagnetic wave generated therefrom. It is desirable that a mounting of a high-frequency shielding case on a substrate on which a high-frequency oscillation circuit is formed be readily made and that the high-frequency shielding case be made as small as possible with a highest possible rigidity.

In an optical head apparatus disclosed, for example, in Jpn. UM. Appl. KOKOKU Publication NO. 7-20935, a high-frequency shielding case for a semiconductor laser device comprises a heat radiator plate overlaid on a bottom surface of a laser diode and having an opening into which a terminal of the laser diode is inserted; a first high-frequency shielding case half overlaid on the heat radiator plate at a side opposite to the laser diode and having an opening into which the terminal of the laser diode having been inserted into the opening of the heat radiation plate is inserted; and a second high-frequency shielding case half fitted on the first high frequency shielding case half, from the side opposite to the heat radiator plate, overlaying a peripheral portion thereof onto a peripheral portion of the first high-frequency shielding case half, and being soldered the peripheral portion to the heat radiator plate, and wherein a high-frequency oscillation circuit board for the laser diode is electrically connected to the terminal of the laser diode, the terminal projecting from the opening, while the circuit board abuts against the peripheral portion of the opening in an inner surface of the first high-frequency shielding case half.

In the high-frequency shielding case of this conventional semiconductor laser apparatus, since the peripheral portion of the second high-frequency shielding case half is directly soldered to the heat radiator plate and heat used for soldering is radiated by the heat radiator plate, lots of heat as well as of time are needed for soldering. Therefore, quantity of heat transmitted from the heat radiator plate to the laser diode becomes large during the soldering operation and, in the soldering operation, a temperature of the laser diode is increased, thus sometimes deteriorating a reliability of the laser diode.

The present invention is derived from this situation and an object of the present invention is to provide a high frequency shielding case of a semiconductor laser apparatus which can decrease heat and time required for soldering to fix a high-frequency shielding case, and hence easier a soldering operation, and can prevent a lowering in a reliability of a laser diode caused by heat generated in a soldering operation.

BRIEF SUMMARY OF THE INVENTION

In order to achieve the above described object of the present invention, a high frequency shielding case for a semiconductor laser apparatus according to the present invention comprises a semiconductor laser holding member having an opening in which a semiconductor laser is inserted and held with a terminal of the semiconductor laser being exposed; a soldering fixing plate, together with the semiconductor laser holding member, fixed by a screw to a fixing member; a shielding case half overlaid on the soldering fixing plate at a side opposite to the semiconductor laser holding member, and having an opening through which the terminal of the semiconductor laser is inserted; an additional shielding case half overlaid on the shielding case half, and co-acting with the shielding case half to store therein a high frequency oscillation circuit board connected to the terminal of the semiconductor laser; and a solder connecting a solder attaching portion of the soldering fixing plate to a portion of at least one of the shielding case half and additional shielding case half, which corresponds to the solder attaching portion of the soldering fixing plate. In such a structure, since the solder attaching portion of the soldering fixing plate is connected by the solder to the portion of at least one of the shielding case half and additional shielding case half which corresponds to the soldering fixing portion of the soldering fixing plate, amount of heat transferred from heat for soldering to the semiconductor laser holding member becomes small and heat and time required for the soldering operation are decreased. And the semiconductor laser held by the semiconductor laser holding member is not deteriorated its reliability by heat in the soldering process.

In the high frequency shielding case for the semiconductor laser apparatus structured as described above and according to this invention, a screw clearance portion for the above described screw is preferably provided in one of the shielding case halves. Such screw clearance portion reduces a whole thickness of the high frequency shielding case.

In the high frequency shielding case for the semiconductor apparatus structured as described above and according to this invention, the solder attaching portion of the soldering fixing plate can be projected outwardly from a peripheral edge of the above-mentioned one shielding case half. Further, at least a portion of a peripheral edge of the above-mentioned one shielding case half, which corresponds to the solder attaching portion of the solder fixing plate, can be inwardly recessed from a remaining portion of the peripheral edge of the above-mentioned shielding case half.

In this case, if a solder is provided between the solder attaching portion of the soldering fixing plate and the portion of the other shielding case half, corresponding to the solder attaching portion, the solder between them is also attached on at least a portion of the peripheral edge of the above-mentioned one shielding case half, corresponding to the solder attaching portion of the soldering fixing plate, and by the solder the solder attaching portion of the soldering fixing plate and the corresponding portion of the peripheral edge of the above-mentioned other shielding case half are mutually fixing to each other, and further the above described at least one portion of the peripheral edge of the above-mentioned one shielding case half is also fixed to the solder attaching portion of the soldering fixing plate. As a result, a soldering strength for fixing the high frequency shielding case is increased.

In the case where the above-mentioned one shielding case half has a square shape in a plan view, the above described at least one portion of the peripheral edge of the above-mentioned one shielding case half can be provided at least two sides of the peripheral edge thereof.

A ground pattern of the high frequency oscillation circuit board can be electrically connected to at least any one of the shielding case halves.

The high frequency shielding case of the semiconductor laser apparatus, according to the present invention can be used in an optical pickup which can holds various optical elements used for recording and/or reproducing information on and from an optical recording medium, such as a CD-ROM, DVD, optical card, etc., used in a magneto optical disk drive, a writing-once type disk drive, phase change type disk drive, etc., and can be used for the optical recording medium so as to record and/or reproduce information on and from the optical recording medium.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

High frequency shielding cases of semiconductor laser apparatuses according to various embodiments of this invention will be explained below with reference to the accompanying drawings.

DETAILED DESCRIPTION OF THE INVENTION

First Embodiment

Figures 1A, 1B:
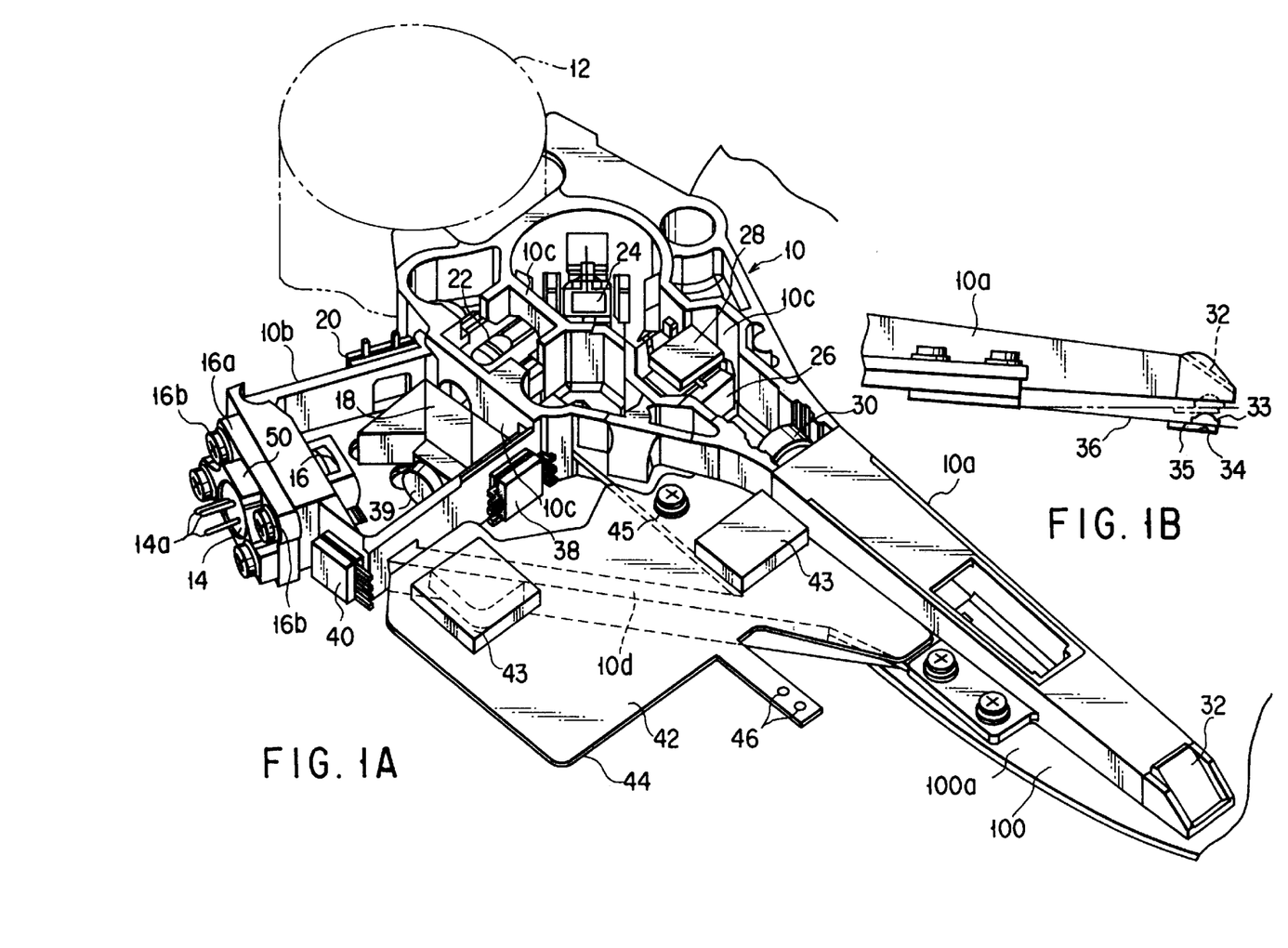
FIG. 1A is a schematic perspective view of a swing arm type optical pickup using a high frequency shielding case of a semiconductor laser apparatus, according to a first embodiment of this invention.
FIG. 1B is an enlarged side view of a forward end portion of the swing arm type optical pickup of FIG. 1A.

FIG. 1A is a schematical perspective view of a swing arm type optical pickup using a high frequency shield case of a semiconductor laser apparatus according to a first embodiment of the present invention; and FIG. 1B is an enlarged side view of a forward end portion of the swing arm type light pickup of FIG. 1A.

The swing arm type optical pickup shown in FIG. 1A is used to record information on a recording layer of an optical disk by narrowing down a light beam which comes from a laser light source through a floating type solid immersion lens (SIL: Solid Immersion Lens) known from Japanese Patent Application KOKAI Publication NO. 5-189796, and to reproduce the information from the recording layer based on a reflected light from the recording layer. An optical recording/reproducing technique using such a floating type solid immersion lens as described above is known from, for example, "NIKKEI BYTE" September 1997 issue and "NIKKEI ELECTRONICS" Sep. 22, 1997 issue. The floating type solid immersion lens is floated off the recording layer formed on a surface of the optical disk at a distance between about 100 nm and about 150 nm by wind produced with a rotation of the optical disk as in the case of a magnetic head of a hard disk. A conventional optical recording/reproducing method by which an optical head is spaced apart from the surface of the optical disk such as a CD, DVD and the like at a distance not less than 1 mm, is called a far field recording, while an optical recording/reproducing method using the floating type solid immersion lens is called as a near-field recording. In the near field recording, a thickness of a light beam used for the recording and reproduction can be made about 1/10 that of a light beam used for the recording and reproduction in the far field recording. For this reason, a recording density in the near field recording can be made about 10 times as large as that in the far field recording.

A housing 10 of the swing arm type optical pickup as shown in FIG. 1A is made of a light-weight material having a high-rigidity, such as a magnesium alloy, to have a substantially L-shaped configuration. An outer surface of an intersecting region at which L-shaped long and short arms 10a and 10b intersect each other, is detachably fixed to an output shaft 12 of a voice coil motor arranged near a peripheral edge of an optical recording disk 100. The voice coil motor has the same structure as that of a voice coil motor used for operating an arm supporting the magnetic head in the conventional hard disk device.

An almost all of an upper surface of the housing 10, excepting the long arm 10a, is opened. The opening is partitioned by several partition walls 10c into several chambers, some of the partition walls having beam passing holes. These partition walls 10c strengthen a rigidity of the housing 10. Upper and lower surfaces of the long arm 10a of the housing 10 are alternately opened along a longitudinal direction of the long arm 10a. This structure also strengthen the rigidity of the long arm 10a. The long arm 10a and short arm 10b of the housing 10 have a rigidity between them reinforced by a diagonally reinforcing rod 10d both ends of which are fixed to outer surfaces of inside walls of the long and short arms.

A laser diode 14 and a condenser lens unit 16 are supported on an end wall of the short arm 10b of the housing 10. The laser diode 14 is operated by a high frequency oscillation circuit or high frequency oscillation superimposing circuit (both circuits are not shown in FIG. 1) for a laser oscillation, which is stored in an electromagnetic shielding case (not shown in FIG. 1), to emit elliptically diverging laser light into a chamber of the short arm 10b of the housing 10. The electromagnetic shielding case and the high frequency oscillation circuit or high frequency oscillation superimposing circuit will be described below in more detail with reference to FIGS. 2A and 2B.

The condenser lens unit 16 changes the elliptically diverging laser light into a parallel laser beam having an elliptical cross-section.

A prism assembly 18 constituted by combining a plurality of prisms and beam splitters with each other is provided on an inner surface of a bottom wall in the chamber of the short arm 10b of the housing 10. The parallel laser beam having the elliptical cross-section and coming from the condenser lens unit 16 is incident on a prism of the prism assembly 18 and is changed into a parallel beam having a circular cross-section. The parallel laser beam having the circular cross-section is then split into two branched beams by a beam splitter of the prism assembly 18. One branched parallel laser beam is guided into a beam passing hole in an outside wall of the short arm 10b and into a photo detector 20 for monitoring, which is provided in the beam passing hole. The other branched parallel laser beam is guided into beam passing holes formed in two partition walls (first and second partition walls) between the chamber of the short arm 10b and the chamber in the intersecting region between the long arm 10a and the short arm 10b.

A relay lens unit 22 is provided between the first partition wall 10c and the second partition wall 10c. The relay lens unit 22 converges the parallel laser beam having the circular cross section, which comes from the prism assembly 18, toward a galvano mirror unit 24 arranged on an inner surface of a bottom wall of the chamber in the above-mentioned intersecting region. The galvano mirror unit 24 reflects the converged laser beam which comes from the relay lens unit 22 toward a half prism 26 arranged at a proximal end portion of an elongated chamber of the long arm 10a of the housing 10. The half prism 26 guides a portion of the converged laser beam which comes from the galvano mirror unit 24 toward a photo detector 28 for monitoring which is arranged on an upper surface of the half prism 26, and guides the remaining portion of the converged laser beam toward an imaging lens 30 arranged at a position nearer a distal end of the long arm 10a than the half prism 26 in the elongated chamber of the long arm 10a. The imaging lens 30 changes the converged laser beam back to the parallel laser beam having the circular cross section, and guides the parallel laser beam having the circular cross section toward a reflection mirror 32 arranged at the distal end of the elongated chamber of the long arm 10a of the housing 10. The reflection mirror 32 directs the parallel laser beam having the circular cross section downward.

Under the reflection mirror 32, a slider member 35 supporting an objective lens 33 and solid immersion lens (SIL) 34 is arranged, as shown in FIG. 1B. The slider member 35 is supported by a support spring 36 on the long arm 10a of the housing 10.

When, by using the laser beam from the laser diode 14 of the housing 10, information recording is performed on a recording layer 100a on an upper surface of the optical recording disk 100 or information reproduction is performed from the recording layer 100a, the housing 10 is reciprocated around the output shaft 12 of the voice coil motor in a predetermined range during the optical recording disk 100 is rotated at a predetermined rotation speed in a predetermined direction. As a result, the slider member 35 supporting the objective lens 33 and solid immersion lens 34 at the distal end of the elongated chamber of the long arm 10a is moved in a radial direction of the optical recording disk 100 in a space located above the recording layer 100a on the upper surface of the optical recording disk 100.

During this period, the slider member 35 supporting the objective lens 33 and solid immersion lens 34 is freely movable in up and down directions in a predetermined range by a resilience of the support spring 36, as indicated by a solid line in FIG. 1B. For this reason, the slider member 35 is floated in a range between about 100 nm and about 150 nm off the upper surface of the optical recording disk 100 which is rotated as described above, by air generated by the optical recording disk 100 rotating as described above.

The laser beam projected onto the recording layer 100a on the upper surface of the optical recording disk 100 via the objective lens 33 and solid immersion lens 33 on the slider member 35 in order to record and/or reproduce an information to and/or from the recording layer 100a on the upper surface of the optical recording disk 100, is reflected by the recording layer 100a. The reflected laser beam is returned back to the prism assembly 18 through the solid immersion lens 34 and objective lens 33 on the slider member 35, imaging lens 30, half-prism 26, galvano mirror unit 24 and relay lens unit 22. The reflected laser beam is split by a beam splitter in the prism assembly 18 into two beams. One split and reflected laser beam is guided into a beam passing hole in the inside wall of the short arm 10b, and is guided into a photo detector 38 for a servo control, which is provided in the beam passing hole. The other split and reflected laser beam is guided through a Wallaston prism and condenser lens 39 in the prism assembly 18 into a beam passing hole in an end wall of the short arm 10b and into a photodetector 40 for reproduction which is provided in the beam passing hole.

When, by not using the laser beam coming from the laser diode 14 of the housing 10 in FIG. 1A, the information recording and/or reproduction are/is not performed on the recording layer 100a on the upper surface of the optical disk 100, at first the support spring 36 for the slider member 35 supporting the objective lens 33 and solid immersion lens 34 is received by a support spring receiver not shown, and held in a rest position as indicated by a two-dots-claim line which is upwardly moved from an operative position indicated by a solid line in FIG. 1. The support spring receiver, not shown, has a similar structure to a known support spring receiver, not shown, for receiving the support spring of the arm supporting the magnetic head in the conventional hard disk unit, not shown.

Then, the housing 10 is driven by the output shaft 12 of the voice coil motor so that the distal end of the elongated chamber of the housing 10, that is, the slider member 35 supporting the objective lens 33 and solid immersion lens 34, is moved from the space located above the upper surface of the optical recording disk 100 toward an outer side of the optical recording disk 100 in its radial direction.

In this embodiment, a flexible substrate 42 on which an electric circuit for operating various electrical or electronic components or circuits on the housing 10, is fixed by a screw 45 on the support rod 10d of the housing 10 in a state that the substrate 42 is fixed on a reinforcing plate 44. The reinforcing plate 44 prevents a disconnection in the above described electrical circuit, in particular, a disconnection in each of IC chips 43 which are included in the electrical circuit. The various electrical or electronic components or circuits includes: the above-mentioned high frequency oscillation circuit, not shown, photo detector 20 for monitoring, photo detector 40 for reproducing and photo detector 38 for a servo control, these photo detectors being provided on the end wall, outside wall and inside wall of the short arm 10b of the housing 10; the galvano mirror unit 24 in the chamber of the intersecting region; and the photodetector 28 for monitoring which is set in the elongated chamber of the long arm 10a of the housing 10.

The flexible substrate 42 has check lands 46. The check lands 46 are used to check whether or not the electrical circuit is normally operated after the electrical circuit has been constructed on the flexible substrate, and whether or not, for the above-mentioned near field recording, the aboved described various electrical or electronic components or circuits are normally operated on the housing 10 in the completely assembled swing arm type optical pickup of FIG. 1A.

In the flexible substrate 42, a portion 42a including the check lands 46 is projected from a remaining portion not including the check lands 46. In this embodiment, the remaining portion of the flexible substrate 42 not including the check lands 46 is overlaid on the reinforcing plate 44, and the portion 42a including the check lands 46 extends outside the reinforcing plate 44. As a result, in the flexible substrate 42, the portion 42a including the check lands 46 has a flexible property relative to the remaining portion not including the check lands 46.

A portion of a ground pattern of the flexible substrate 42 is electrically connected to the housing 10 by the screw 45 by which the flexible substrate 42 is fixed on the supporting rod 10d of the housing 10.

Figures 2A, 2B, 2C:
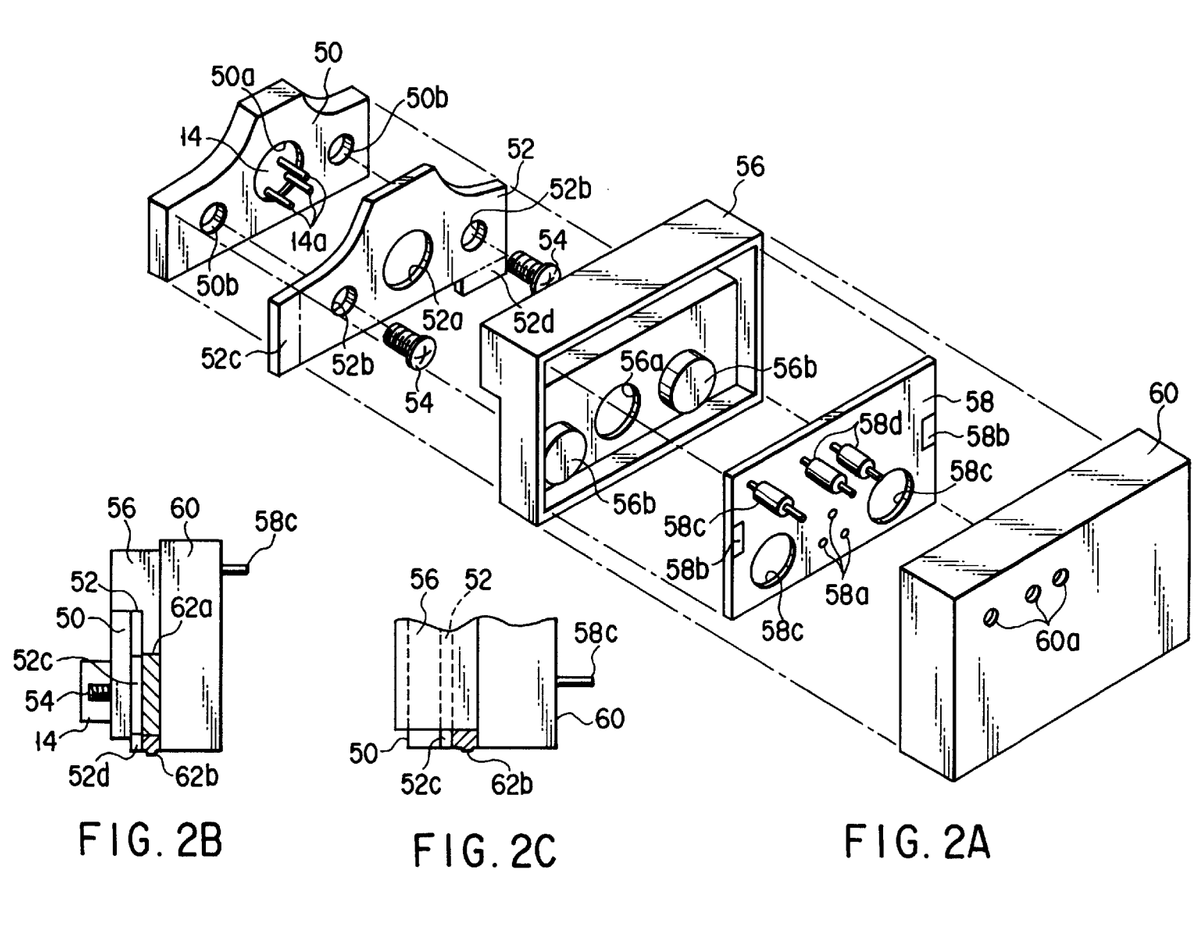
FIG. 2A is an exploded perspective view of a high frequency shielding case, soldering fixing plate for fixing the high frequency shielding case to a housing of the swing arm type optical pickup shown in FIG. 1A, and laser diode holding member, the high frequency shielding case being according to the present invention and storing a high frequency oscillation circuit for a laser diode of the semiconductor laser apparatus in the swing arm type optical pickup.
FIG. 2B is a side view showing the high frequency shielding case, soldering fixing plate and laser diode holding member in FIG. 2A in a state in which these are mutually fixed together by a solder.
FIG. 2C is a plan view partly showing the high frequency shielding case, soldering fixing plate and laser diode holding member in FIG. 2A in a state in which these are fixed together by a solder.

FIG. 2A is an exploded perspective view showing a high frequency shielding case according to a first embodiment of the present invention and storing the high frequency oscillation circuit for the laser diode 14 of the semiconductor laser device of the swing arm type optical pickup shown in FIG. 1A, a soldering fixing plate for fixing the high frequency shielding case to the housing of the swing arm type optical pickup, and a laser diode holding member; FIG. 2B is a side view showing the high frequency shielding case, soldering fixed plate and laser diode holding member shown in FIG. 2A in a state that these are fixed together by soldering; and FIG. 2C is a portion of a plan view showing the high frequency shielding case, soldering fixing plate and laser diode holding member shown in FIG. 2A in a state that these are fixed together by soldering.

As shown in FIGS. 1A and 2A, the laser diode 14 is inserted into an opening 50a in the laser diode holding member 50 and held in it with laser diode terminals 14a being exposed. The laser diode holding member 50 is formed from a brass plate by a press work, and a pair of screw insertion holes 50b are provided at both sides of the opening 50a for the laser diode terminals 14a.

As shown in FIG. 2A, in the laser diode holding member 50, a soldering fixing plate 52 having an opening 52a into which the laser diode terminals 14a are inserted is overlaid on a side surface at which the laser diode terminals are exposed. The soldering fixing plate 52 is formed from a tin-plated iron plate, and has a pair of screw insertion holes 52b at both sides of the opening 52a for the laser diode terminals 14a.

The laser diode holding 50 and the soldering fixing plate 52 are fixed by a pair of fastening screws 54 to a fixing member, an outer end surface of a support frame 16a of the condenser lens unit 16 shown in FIG. 1A, the condenser lens unit 16 being made of a magnesium alloy and the pair of fastening screws 54 being inserted in a pair of screw insertion holes 52b of the soldering fixing plate 52 and a pair of screw insertion holes 50b of the laser diode holding member 50 from a side thereof opposite to the laser diode holding member 50. The support frame 16a of the condenser lens unit 16 is fixed to an extending end portion of the short arm 10b of the housing 10 by fastening screws 16b made of iron plated with nickel.

To the soldering fixing plate 52 a first high frequency shielding case half 56 is overlaid on the side opposite to the laser diode holding member 50, the first high frequency shielding case half being made of brass plated with tin. An insertion hole 14a through which the laser diode terminals 14a are inserted is formed in the first high frequency shielding case half 56. The first high frequency shielding case half 56 further has screw head storage recesses (screw escape portions) on both sides of the opening 56a, and heads of the paired fastening screws 54 for fixing the laser diode holding member 50 and soldering fixing plate 52 are stored in the recessed. The screw head storage recesses 56b are so formed as to have a pair of positions corresponding to the paired screw insertion holes 52b in the soldering fixing plate 52, recessed in the first high frequency shielding case half 56 in a direction opposite to the soldering fixing plate 52 (In FIG. 2A, paired projections created by the recessed positions are shown).

At least one portion of the peripheral edge of the first high frequency shielding case half 56 is positioned at an inner side than a corresponding portion of the peripheral edge of the soldering fixing plate 52 which corresponds to the at least one portion of the peripheral edge of the first high frequency shielding case half. Stated in more detail, with this embodiment, the peripheral edge of the first high frequency shielding case half 56 is bent in the direction opposite to the soldering fixing plate 52 to provide a rectangular peripheral wall. The peripheral edge of the soldering fixing plate 52 has two solder attaching portions 52c, 52d in two portions thereof corresponding to two sides (in FIG. 2A, a left side and a lower side) of the peripheral edge of the first high frequency shielding case half 56, and the two solder attaching portions extend more outwardly than the above described two sides.

A high frequency oscillation circuit board 58 is overlaid on the first high frequency shielding case half 56 on a side opposite to the soldering fixing plate 52, and the above-mentioned high frequency oscillation circuit or high frequency oscillation superimposing circuit (in the following descriptions, only the high frequency oscillation circuit will be referred to) for the laser diode 14 is constituted. The high frequency oscillation circuit board 58 has terminal through holes 58a into which the laser diode terminals 14a exposed through the opening 50a of the laser diode holding member 50, opening 52a of the soldering fixing plate 52 and opening 56a of the high frequency shielding case half 56, are inserted. The laser diode terminals 14a inserted into the terminal through holes 58 are soldered to the terminal through holes 58a to make electrically connection with the above-mentioned high frequency oscillation circuit. And, ground patterns 58b of the above-mentioned high frequency oscillation circuit are formed on the peripheral edge of the high frequency oscillation circuit board 58. The ground patterns 58b are electrically connected to the peripheral wall of the first high frequency shield case half 56 when the above-mentioned high frequency oscillation circuit of the high frequency oscillation circuit board 58 is electrically connected to the laser diode terminals 14a inserted through the terminal through holes 58a, as described above.

In the high frequency oscillation circuit board 58, openings 58c are formed on both sides of the terminal through holes 58a so as to receive the projections corresponding to the paired screw head storage recesses 56b in the first high frequency shielding case half 56. The high frequency oscillation circuit board 58 projects through condensers 58d (here, referred to simply as condensers) in a side opposite to the first high frequency shielding case half 56, so as to electrically connect the high frequency oscillation circuit to the above-mentioned electrical circuit on the flexible substrate 42 fixed on the supporting rod 10*d* of the housing 10 as shown in FIG. 1A.

In a side opposite to the first high frequency shielding case half 56, a second high frequency shielding case half 60 is overlaid on the high frequency oscillation circuit 58. A peripheral edge portion of the second high frequency shielding case half 60 is bent on a side of the first high frequency shielding case half 56, and constitutes a square peripheral wall. The peripheral wall of the second high frequency shielding case half 60 is overlapped on an outer surface of the peripheral wall of the first high frequency shielding case half 56. The second high frequency shielding case half 60 co-acts with the first high frequency shielding case half 56 to store the high frequency oscillation circuit board 58.

Condenser insertion holes 60*a* for external connection are formed in the second high frequency shielding case half 60, into which the condensers 58*d* of the high frequency oscillation circuit board 58 are inserted. When the peripheral wall of the second high frequency shielding case half 60 is overlapped on the outer surface of the peripheral wall of the first high frequency shielding case half 56 and the high frequency oscillation circuit board 58 is stored between the second high frequency shielding case half 60 and the first high frequency shielding case half 56, the condensers 58*d* of the high frequency oscillation circuit board 58 are inserted into the condenser insertion holes 60*a* for external connection, in the second high frequency shielding case half 60 and are projected toward an external space. And outer peripheral surfaces of the condensers 58*d* are soldered to the condenser insertion holes 60*a* for external connection, in the second high frequency shielding case half 60.

After the peripheral wall of the second high frequency shielding case half 60 is overlapped on the outer surface of the peripheral wall of the first high frequency shielding case half 56, molten solders 62*a*, 62*b* are introduced, as shown in FIGS. 2B and 2C, between the second solder attaching portions 52*c*, 52*d* of the soldering fixing plate 52 and two portions of the peripheral edge of the second high frequency shielding case half 60, the two portions corresponding to the two solder attaching portions 52*c*, 52*d* at the peripheral edge of the soldering fixing plate 52.

By the solders 62*a* and 62*b*, the solder attaching portions 52*c*, 52*d* of the peripheral edge of the soldering fixing plate 52 and the above-mentioned two portions of the peripheral edge of the second high frequency shielding case half 60, corresponding to the solder attaching portions 52*c*, 52*d*, together with two portions of the peripheral edge of the first high frequency shielding case half 56, corresponding to the two solder attaching portions 52*c*, 52*d*, are mutually soldered and mutually connected in a mechanical and electrical way.

Upon soldering, the soldering fixing plate 52, first high frequency shielding case half 56 and second high frequency shielding case half 60 mutually soldered are thin and high in heat radiator effect. Therefore, a time required of heating and cooling upon soldering is short and a soldering operation is easier. And a relatively larger soldering area can be secured in the mutual soldering of the soldering fixing plate 52, first high frequency shielding case half 56 and second high frequency shielding case half 60 and it is possible to obtain a relatively large bond strength by the solders 62*a* and 62*b*.

The soldering fixing plate 52 to which the first high frequency shielding case half 56 and second high frequency shielding case half 60 are strongly fixed by the solders 62*a* and 62*b* as described above, together with the laser diode holding member 50, is fixed by the above-mentioned paired fastening screws 54 to the external end surface of the support frame 16*a* of the condenser lens unit 16. The support frame 16*a* of the condenser lens unit 16 is fixed to the extending end portion of the short arm 10*b* of the housing 10 by means of the fastening screws 16*b*. Therefore, the first high frequency shielding case half 56 and second high frequency shielding case half 60, together with the soldering fixing plate 52 and laser diode holding member 50, are strongly fixed to the extending end portion of the short arm 10*b* of the housing 10 through the support frame 16*a* of the condenser lens unit 16.

In the case where the rigidity of the fixing strength by the solders 62*a* and 62*b* is insufficient, the mutually overlapping portions of the first high frequency shielding case half 56 and second high frequency shielding case half 60 can be reinforced by a nonconductive adhesive or a conductive adhesive.

The ground patterns 58*d* of the high frequency oscillation circuit of the high frequency oscillation circuit board 58 stored between the first high frequency shielding case half 56 and the second high frequency shielding case half 60 are electrically connected to a ground of a package of the laser diode 14 held in the laser diode holding member 50, through the first high frequency shielding case half 56 connected by the solder to the ground patterns 58*d* as described above, soldering fixing plate 52 connected by the solders 62*a* and 62*d* to the first high frequency shielding case half 56 as described above, and the laser diode holding member 50 which, together with the soldering fastening plate 52, is fixed to the support frame 16*a* of the condenser lens unit 16 by the paired fastening screws 54 as described above.

Further, the ground patterns 58*d* is also electrically connected to the above-mentioned ground pattern of the flexible substrate 42 through the fastening screws 16*b* for fixing the support frame 16*a* of the condenser lens unit 16 to the extending end portion of the short arm 10*b* of the housing 10 as described above and a screw 70 for fixing the flexible substrate 42 to the reinforcing rod 10*d* of the housing 10 as described above with reference to FIG. 1(A).

In this embodiment, although the solder attaching portions 52*c*, 52*d* of the peripheral edge of the soldering fixing plate 52 are provided respectively to correspond to the two sides of the rectangular configuration of the first high frequency shielding case half 56, the solder attaching portions may be provided respectively to correspond to three or four sides of the rectangular configuration of the first high frequency shielding case half or provided respectively to the whole of the peripheral edge of the rectangular configuration of the first high frequency shielding case half. Further, not less than two solder attaching portions 52*c*, 52*d* may be provided at any one of four rides of the rectangular configuration of the first high frequency shielding case half.

The peripheral edge configuration of each of the first high frequency shielding case half 56 and second high frequency shielding case half 60 is not restricted to the rectangular configuration, and can be any configuration including a triangular, polygonal more than rectangular, circular and elliptical configurations.

Further, the solder attaching portions of the peripheral edge portion of the solder fixing plate 52 are not limited to project from the peripheral edge of the first high frequency shielding case half 56, they may be formed by inwardly recessing at least one portion of the peripheral edge of the first high frequency shielding case half 56, so that at least one portion of the peripheral edge of the soldering fixing plate 52, corresponding to the at least one portion of the peripheral edge of the first high frequency shielding case half 56, can be used as the solder attaching portion.

Second Embodiment

A high frequency shielding case of a semiconductor laser apparatus according to a second embodiment of the present invention will be explained below with reference to FIGS. 3A, 3B and FIG. 4.

The high frequency shielding case of the semiconductor laser apparatus, according to the second embodiment is a high frequency shielding case which stores the high frequency oscillation circuit for the laser diode 14 of a swing arm type optical pickup shown in FIG. 1A, as in the case of the high frequency shielding case of the semiconductor laser apparatus according to the first embodiment of the present invention as described above with reference to FIGS. 1A, 1B and 2A to 2C.

Figures 3A, 3B:
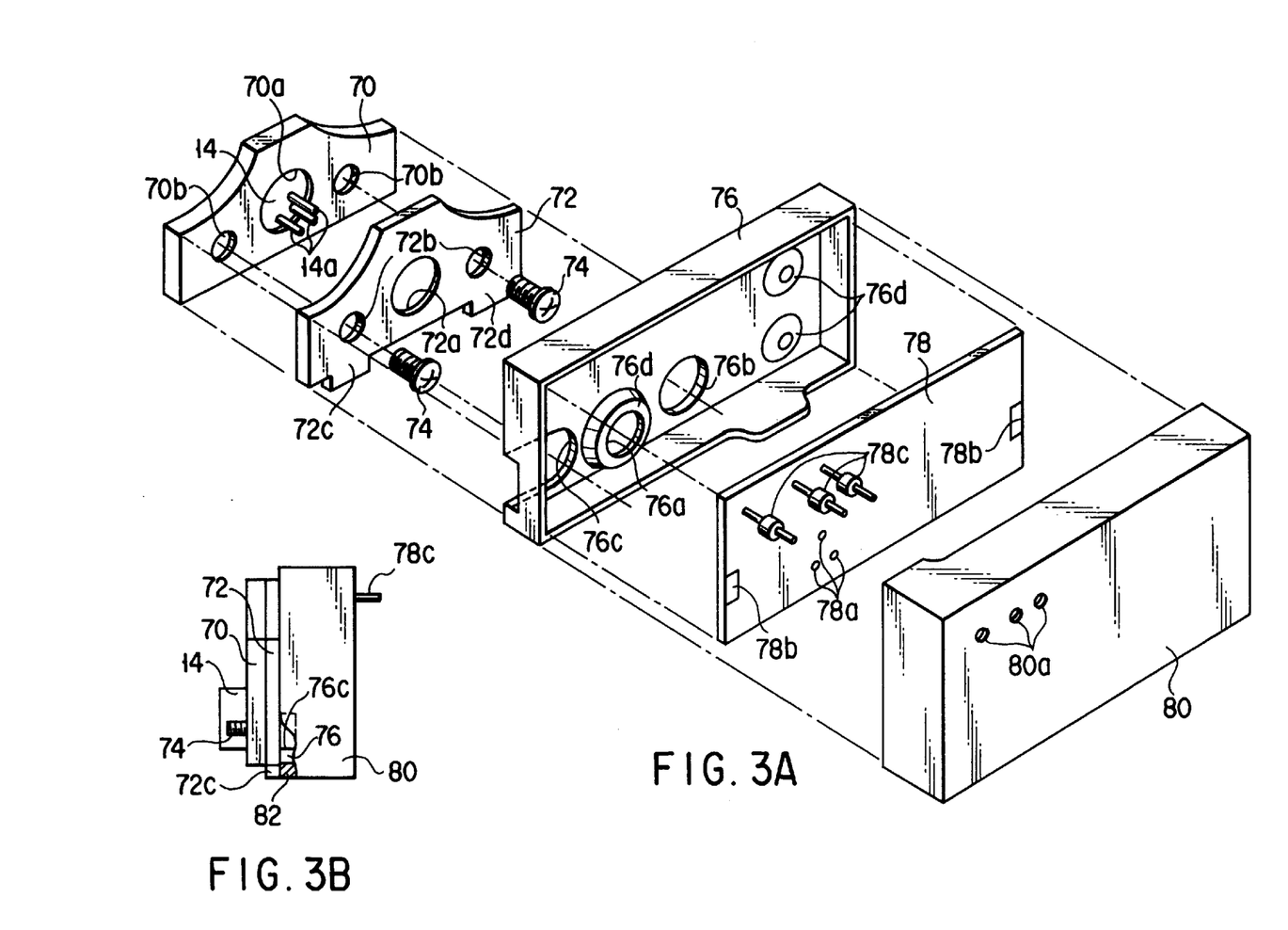
FIG. 3A is an exploded perspective view of a high frequency shielding case, soldering fixing plate for fixing the high frequency shielding case to a housing of the swing arm type optical pickup shown in FIG. 1A, and laser diode holding member, the high frequency shielding case being according to a second embodiment and storing the high frequency oscillation circuit for the laser diode of the semiconductor laser apparatus in the swing arm type optical pickup.
FIG. 3B is a side view showing the high frequency shielding case, soldering fixing plate and laser diode holding member in a state in which these are mutually fixed together by the solder.

FIG. 3A is an exploded perspective view showing a high frequency shielding case according to the second embodiment of the present invention and storing the high frequency oscillation circuit for the laser diode 14 of the semiconductor laser apparatus in the swing arm type optical pickup as shown in FIG. 1A, a soldering fixing plate for fixing the high frequency shielding case to the housing of the swing arm type optical pickup, and a laser diode holding member; and FIG. 3B is a side view showing the high frequency shielding case, soldering fixing plate and laser diode holding member in a state in which these are mutually fixed by a solder.

Figure 4:
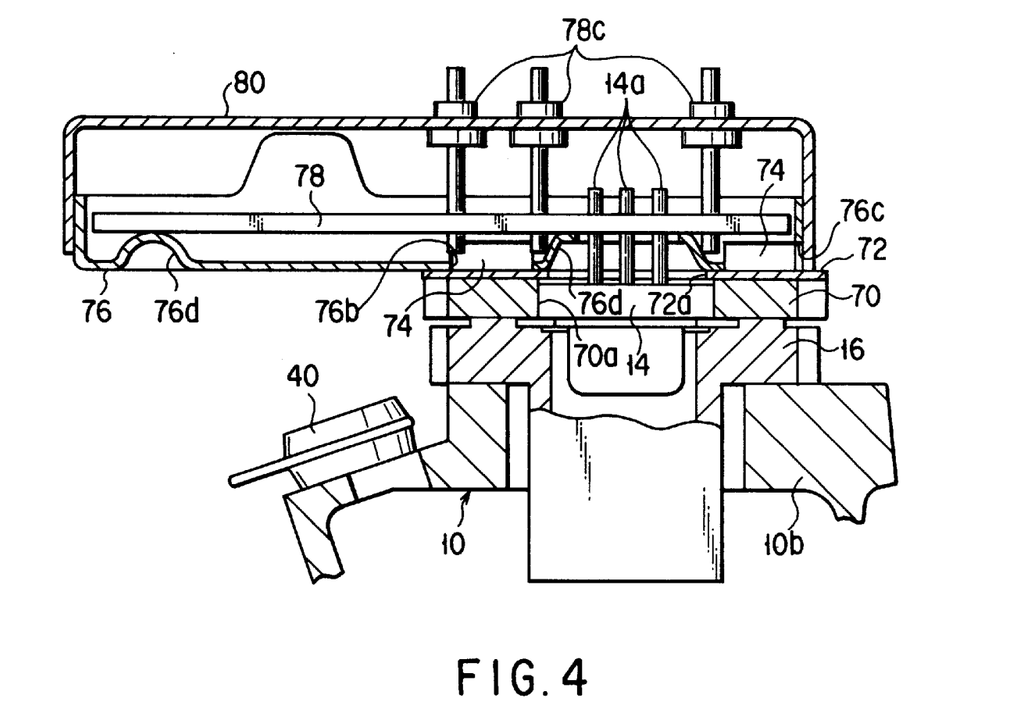
FIG. 4 is a horizontal cross-sectional view showing a state in which the high frequency shielding case of FIG. 3A is mounted on an end wall of a short arm of the housing of the swing arm type optical pickup shown in FIG. 1A.

FIG. 4 is a horizontal cross-section showing a state in which the high frequency shielding case of FIG. 3A is mounted on the end wall of the short arm 10b of the housing of the swing arm type optical pickup shown in FIG. 1A.

As shown in FIGS. 3A and 4, the laser diode 14 is inserted in an opening 70a in a laser diode holding member 70 and held therein with its laser diode terminals 14a being exposed. The laser diode holding member 70 is formed of a brass plate by a press work, and has a pair of screw insertion holes 70b provided on both sides of the opening 70a for the laser diode terminals 14a.

As shown in FIGS. 3A and 4, on a side of in the laser diode retaining member 70 the laser diode terminals 14a are exposed, at the side a soldering fixing plate 72 is overlaid, and the plate 72 has an opening 72a through which the laser diode terminals 14a are inserted. The soldering fixing plate 52 is formed from an iron plate plated with tin, and has a pair of screw insertion holes 72b on both sides of the opening 72a for the laser diode terminals 14a.

By a pair of fastening screws 74 inserted from a side opposite to the laser diode holding member 70 into the paired screw holes 72b of the soldering fixing plate 72 and paired screw holes 70b of the laser diode holding member 70, the laser diode holding member 70 and soldering fixing plate 72 are fixed to a fixing member (in this embodiment, to the external end surface of the support frame 16a (made of a magnesium alloy) of the condenser lens unit 16 shown in FIG. 1(A)), as shown in FIG. 4. The support frame 16a of the condenser lens unit 16 is fixed to the extending end portion of the short arm 10b of the housing 10 by fastening screws 16b made of iron plated with nickel.

A first high frequency shielding case half 76 is overlaid on the soldering fixing plate 72 from a side opposite to the laser diode holding member 70, and is made of brass plated with tin. The first high frequency shielding case half 76 in this embodiment is more slender along the swing direction of the housing 10 of the swing arm type optical pickup shown in FIG. 1A than the first high frequency shielding case half 56 of the first embodiment as described above with reference to FIGS. 2A to 2C in particular, and its thickness in a laser light emitting direction from the laser diode 14 is set smaller.

In the first high frequency shielding case half 76 an opening 76a is provided into which the laser diode terminals 14a are inserted. Further, the first high frequency shielding case half 76 has screw head storage openings 76b, 76c (screw escape portion) on both sides of the opening 76a to store heads of a pair fastening screws 74 for the fixing of the laser diode holding member 70 and soldering fixing plate 72. In this embodiment, the screw head storage opening 76c is located near one end of a longitudinal direction of the first high frequency shielding case half 76 and cut also in the peripheral wall of the first high frequency shielding case half 76 which is projected from the peripheral edge of the first high frequency shielding case half 76 in a side opposite to the soldering fixing plate 72.

In a bottom wall of the first high frequency shielding case half 76 which is overlaid on the soldering fixing plate 72, a periphery of the opening 76a into which the laser diode terminals 14a are inserted, and two portions spaced apart in the longitudinal direction of the first high frequency shielding case half 76 from the opening 76a and spaced apart in a width direction (in up/down directions in FIG. 3A) intersecting the above-mentioned longitudinal direction, are recessed in a side opposite to the soldering fixing plate 72 and form projections 76d. The projections 76d provide support bases for a high frequency oscillation circuit board described later.

At least one portion of the peripheral edge of the first high frequency shielding case 76 is situated on an inner side than a corresponding portion of the peripheral edge of the soldering fixing plate 72 corresponding to the at least one portion of the peripheral edge of the first high frequency shielding case half 76. Stated in more detail, the peripheral edge of the first high frequency shielding case 76 in this embodiment is bent in an direction opposite to the soldering fixing plate 72 to provide a rectangular peripheral wall. The peripheral edge of the soldering fixing plate 72 has two solder attaching portions 72c, 72d on a portion (the lower edge in FIG. 3A) corresponding to one (lower side in FIG. 3A) of longitudinally extending two sides of the peripheral edge of the first high frequency shielding case half 76, and the two solder attaching portions 72c, 72d outwardly project beyond the above described one of longitudinally extending two sides.

When the bottom wall of the first high frequency shielding case half 76 is overlaid on the soldering fixing plate 72, the screw head storage opening 76c situated near the one longitudinal end in the bottom wall of the first high frequency shielding case half 76 is all blocked by the soldering fixing plate 72 except the above-mentioned peripheral cut portion.

On the projections 76d in a side of the first high frequency shielding case half 76, the side opposing to the soldering fixing plate 72, a high frequency oscillation circuit board 78 is overlaid, and the above-mentioned high frequency oscillation circuit or high frequency oscillation superimposition circuit (after here, only the high frequency oscillation circuit will be referred to) for the laser diode 14 is formed on the circuit board 78. The high frequency oscillation circuit board 78 has terminal through holes 78a through which the laser diode terminals 14a exposed through the opening 70a of the laser diode holding member 70, opening 72a of the soldering fixing plate 72 and opening 76a of the first high frequency shielding case half 76, are inserted. The laser diode terminals 14a inserted through the terminal through holes 78 are soldered to the terminal through holes 78 and electrically connected to the above-mentioned high frequency oscillation circuit. Ground patterns 78b of the high frequency oscillation circuit is formed at the peripheral edge of the high frequency oscillation circuit board 78. When the above-mentioned high frequency oscillation circuit is electrically connected, as described above, to the laser diode terminals 14a inserted through the terminal through hole 78, the ground patterns 78b are also electrically connected to the peripheral edge of the first high frequency shielding case half 76.

The high frequency oscillation board 78 projects condensers 78c in a side opposite to the first high frequency shielding case half 76, and the condensers 78c are used for electrically connecting the high frequency oscillation circuit to the above-mentioned electrical circuit on the flexible substrate 42 fixed on the support rod 10d of the housing 10, as shown in FIG. 1A.

A second high frequency shielding case half 80 is overlaid on a side of the high frequency oscillation circuit board 78, the side being opposite to the first high frequency shielding case half 76. The peripheral edge of the second high frequency shielding case half 80 is bent in a side of the first high frequency shielding case half 76 and constitutes an elongated rectangular peripheral wall corresponding to the elongated rectangular peripheral edge of the first high frequency shielding case half 76.

The peripheral wall of the second high frequency shielding case half 80 is overlapped on an outside of the peripheral wall of the first high frequency shielding case half 76, and the second high frequency shielding case half 80 is co-acted with the first high frequency shielding case half 76 to store the high frequency oscillation circuit board 78 therein. In this case, the screw head escape opening 76c located near the one longitudinal end of the bottom wall of the first high frequency shielding case half 76 has its above-mentioned peripheral wall cut closed by the peripheral edge of the second high frequency shielding case half 80, as shown in FIG. 4.

Condenser insertion holes 80a are formed in the second high frequency shielding case 80, and through condensers (herein simply referred to as condensers) of the high frequency oscillation circuit board 78 are inserted into the through holes 80a. When the peripheral wall of the second high frequency shielding case half 80 is overlapped on the outside of the peripheral wall of the first high frequency shielding case half 76 and the high frequency oscillation circuit board 78 is stored by the second high frequency shielding case half 80 and the first high frequency shielding case half 76, the condensers 78c of the high frequency oscillation circuit board 78 are inserted into the condenser insertion holes 80a for external connection in the second high frequency shielding case half 80, and are projected toward an external space. An outer peripheral surface of the condenser 78c is soldered to the condenser insertion holes 80a for external connection in the second high frequency shielding case half 80.

After the peripheral wall of the second high frequency shielding case half 80 is overlapped on the outside of the peripheral wall of the first high frequency shielding case half 76, a molten solder 82 is introduced, as shown in FIG. 3B, between the two solder attaching portions 72c, 72d of the peripheral edge of the soldering fixing plate 72 and the two portions of the peripheral edge of the second high frequency shielding case half 80, the two portions corresponding to the two solder attaching portions 72c, 72d of the peripheral edge of the soldering fixing plate 72. By this solder 82, the two soldering fixing portions 72c, 72d of the peripheral edge of the soldering fixing plate 72 and the above-mentioned two portions of the second high frequency shielding case half 80, the two portions corresponding to the two soldering fixing sections 72c, 72d, together with the two portions of the peripheral edge of the first high frequency shielding case half 76, the two portions also corresponding to the two soldering fixing portions 72c, 72d, are mutually soldered and mutually mechanically and electrically connected.

And, since the first high frequency shielding case half 76 and second high frequency shielding case half 80 are respectively thin and high in heat radiator effect, time required for heating and cooling for soldering is decreased so that a soldering operation is easier. Further, since a relatively great area for soldering can be ensured in the soldering fixing plate 72, first high frequency shielding case half 76 and second high frequency shielding case half 80, fixing strength by the solder 82 can becomes large.

The soldering fixing plate 72 with which the first high frequency shielding case half 76 and second high frequency shielding case half 80 are strongly bonded by the solder 82 as described above, is fixed, together with the laser diode holding member 70, to the external end surface of the support frame 16a of the condenser lens unit 16 by means of the paired fastening screws 74, as described above. The support frame 16a of the condenser lens unit 16 is fixed by the fastening screws 16b (see FIG. 1A) to the extending end portion of the short arm 10b of the housing 10. Thus, the first high frequency shielding case half 76 and second high frequency shielding case half 80 are strongly fixed, together with the soldering fixing plate 72 and laser diode holding member 70, to the extending end portion of the short arm 10b of the housing 10 through the support frame 16a of the condenser lens unit 16.

When a rigidity of the bond strength by the solder 82 is insufficient, the mutually overlapped portions of the peripheral edges of the first high frequency shielding case half 76 and second high frequency shielding case half 80 can be reinforced by a nonconductive adhesive or conductive adhesive.

The ground patterns 78b of the high frequency oscillation circuit of the high frequency oscillation circuit board 78 stored between the first high frequency shielding case half 76 and the second high frequency shielding case half 80 are electrically connected to a ground of a package of the laser diode 14 hold in the laser diode holding frame 16a as described above, through the first high frequency shielding case half 76 connected by the solder to the ground patterns 78b as described above, the soldering fixing plate 72 connected by the solder 82 to the first high frequency shielding case half 76 as described above and the laser diode holding member 70 fixed, together with the soldering fixing plate 72, to the support frame 16a of the condenser lens unit 16 by means of the paired fastening screws 74 as described above.

Further, the ground patterns 78b of the high frequency oscillation circuit are further electrically connected to the above-mentioned ground pattern of the flexible board 42 through the fastening screws 16b (see FIG. 1A) fixing the support frame 16a of the condenser lens unit 16 to the extending end portion of the short arm 10b of the above-mentioned housing 10 as described above and the screw 70 fixing the flexible substrate 42 to the reinforcing rod 10d of the housing 10 as described above with reference to FIG. 1A.

In this embodiment, the first high frequency shielding case half 76 and hence the second high frequency shielding case half 80 overlaid thereon are more elongated in the swinging direction of the housing 10 of the swing arm type optical pickup as shown in FIG. 1A than the above-mentioned first high frequency shielding case half 56 and hence the second high frequency shielding case half 60 overlaid thereon in the first embodiment as described above with reference to FIGS. 2A to 2C in particular, but a thickness of the first and second case halves 76, 80 of the second embodiment in an emitting direction of the laser beam from the laser diode 1 is set to be smaller than that of the first and second case halves 56, 60 of the first embodiment. For this reason, a moment of inertia of the high frequency shielding case in the semiconductor laser apparatus according to the second embodiment is smaller than that of the high frequency shielding case in the semiconductor laser apparatus of the above-mentioned first embodiment. Thus, a swing speed of the swing arm type optical pickup equipped with the high frequency shielding case of the semiconductor laser apparatus according to the second embodiment, can be increased and hence an access speed and following speed of the above-mentioned swing arm type optical pickup with respect to a desired recording track on the recording layer 100a of the optical disk 100 becomes higher. And, a time required to record and reproduce information on and from the recording layer 100a on the optical disk 100 becomes short and an accuracy of the recording and reproduction becomes high.

In this embodiment, although the solder attaching portions 72c, 72d of the peripheral edge of the soldering fixing plate 72 are so formed as to correspond to one side of the rectangular peripheral edge of the first high frequency shielding case half 76, one solder attaching portion may be formed on each of two, three or four sides thereof or not less than two solder attaching portions may be formed on each of any sides thereof, or one solder attaching portion may be formed on all over the peripheral edge thereof.

The shape of the peripheral edge of each of the first high frequency shielding case half 76 and second high frequency shielding case half 80 is not restricted to the rectangular shape, and it can be any shape, such as triangular, polygonal more than rectangular, or a circular or elliptical shape.

Further, the soldering fixing portion of the peripheral edge of the soldering fixing plate 72 can be formed not only to be projected from the peripheral edge of the first high frequency shielding case half 76 but also to be recessed inwardly at least one portion of the peripheral edge of the first high frequency shielding case half 76 is inwardly and to make at least a portion of the peripheral edge of the soldering fixing plate 72 corresponding to the at least inwardly recessed portion as a solder attaching portion.

Further advantage and variants of the present invention are evident to those skilled in the art.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A high frequency shielding case of a semiconductor laser apparatus, comprising:

a semiconductor laser holding member having an opening through which a semiconductor laser is inserted and held with a terminal of the semiconductor laser being exposed;

a soldering fixing plate, together with the semiconductor laser holding member, fixed to a fixing member by a screw;

a shielding case half overlaid on the soldering fixing plate on a side opposite to the semiconductor laser holding member and having an opening through which the terminal of the semiconductor laser is inserted;

an additional shielding case half overlaid on the shielding case half and co-acting with the shielding case half to store therein a high frequency oscillation circuit board connected with the terminal of the semiconductor laser; and a solder which connects a solder attaching portion of the soldering fixing plate to a portion of at least one of the shielding case half and additional shielding case half, the portion corresponding to the solder attaching portion of the soldering fixing plate.

2. A high frequency shielding case of a semiconductor laser apparatus, according to claim 1, wherein the one shielding case half has a screw escape portion.

3. A high frequency shielding case of a semiconductor laser apparatus, according to claim 1, wherein the solder attaching portion of the soldering fixing plate is outwardly projected from a peripheral edge of the one shielding case half.

4. A high frequency shielding case of a semiconductor laser apparatus, according to claim 1, wherein at least a portion of a peripheral edge of the one shielding case half, the portion corresponding to the solder attaching portion of the soldering fixing plate, is inwardly recessed from the rest of the peripheral edge of the one shielding case half.

5. A high frequency shielding case for a semiconductor laser apparatus, according to claim 1, wherein the one shielding case half has a rectangular shape in a plan view, and the at least one portion of the peripheral edge of the one shielding case half is provided at least two sides of the peripheral edge.

6. A high frequency shielding case of a semiconductor laser apparatus, according to claim 1, wherein a ground pattern of the high frequency oscillation circuit board is electrically connected to either one of the shielding case half and additional shielding case half.

* * * * *